United States Patent
Hery et al.

(10) Patent No.: US 9,905,045 B1
(45) Date of Patent: Feb. 27, 2018

(54) STATISTICAL HAIR SCATTERING MODEL

(71) Applicant: Pixar, Emeryville, CA (US)

(72) Inventors: Christophe Hery, San Rafael, CA (US); Leonid Pekelis, San Bruno, CA (US)

(73) Assignee: Pixar, Emeryville, CA (US)

( * ) Notice: Subject to any disclaimer, the term of this patent is extended or adjusted under 35 U.S.C. 154(b) by 65 days.

(21) Appl. No.: 14/666,610

(22) Filed: Mar. 24, 2015

Related U.S. Application Data

(60) Provisional application No. 61/971,485, filed on Mar. 27, 2014.

(51) Int. Cl.
*G06T 15/50* (2011.01)
*G06T 15/06* (2011.01)
*G06T 15/00* (2011.01)
*G06T 13/20* (2011.01)

(52) U.S. Cl.
CPC ............ *G06T 15/506* (2013.01); *G06T 13/20* (2013.01); *G06T 15/005* (2013.01); *G06T 15/06* (2013.01)

(58) Field of Classification Search
CPC ...................................................... G06T 13/40
See application file for complete search history.

(56) References Cited

U.S. PATENT DOCUMENTS

| | | | |
|---|---|---|---|
| 2011/0216074 A1 | 9/2011 | Witkin et al. | |
| 2013/0215139 A1* | 8/2013 | Xie | G06T 11/001 345/595 |

OTHER PUBLICATIONS

D'Eon, E., Francois, G., Hill, M., Letteri, J, and J. M. Aubry,. 2011. A energy-conserving hair reflectance model. In Computer Graphics Forum, vol. 30, Issue 4, pp. 1181-1187.
D'Eon, E., Marschner, S., and J. Hanika, 2013. Importance sampling for physically based hair fiber models. In SIGGRAPH Asia, 2013 Technical Briefs, ACM, 25.
Hery, C., and R. Ramamoorthi, 2012. Importance sampling of reflection from hair fibers. Journal of Computer Graphics Techniques (JCGT) 1, 1, 1-17.
Marschner, S. R., Jensen, H. W., Cammarano, M., Worley, S., and P. Hanrahan, 2003. Light scattering from human hair fibers. In ACM Transactions on Graphics (TOG), vol. 22, ACM, 780-791.

* cited by examiner

*Primary Examiner* — Zhengxi Liu
*Assistant Examiner* — Raffi Isanians
(74) *Attorney, Agent, or Firm* — Kilpatrick Townsend & Stockton LLP

(57) ABSTRACT

Systems, devices, and methods are provided for rendering images of hair using a statistical light scattering model for hair that approximates ground truth physical models. The model is significantly faster than other implementations of the Marschner hair model. The statistical light scattering model includes all the features of Marschner such as eccentricity for elliptical cross-sections, and extends them by adding azimuthal roughness control, consideration of natural fiber torsion, and full energy preserving. Adaptive Importance Sampling (AIS) is specialized to fit easily sampled distributions to bidirectional curve scattering density functions (BCSDFs) of the model.

17 Claims, 8 Drawing Sheets

STATISTICAL HAIR SCATTERING MODEL

CROSS-REFERENCES TO RELATED APPLICATIONS

This Application claims the benefit of and priority to U.S. Provisional Application No. 61/971,485, filed on Mar. 27, 2014, and entitled "STATISTICAL HAIR SCATTERING MODEL," the entire disclosure of which is hereby incorporated by reference for all purposes.

BACKGROUND

With the widespread availability of computers, computer graphics artists and animators can rely upon computers to assist in production process for creating animations and computer-generated imagery (CGI). This may include using computers to have physical models be represented by virtual models in computer memory. Typically, two-dimensional (2D) or three-dimensional (3D) computer-aided animation combines 2D/3D models of objects and programmed movement of one or more of the models. In 3D computer animation, the first step is typically the object modeling process. Virtual objects can be sculpted much like real clay or plaster, working from general forms to specific details, for example, with various sculpting tools. Models may then be constructed, for example, out of geometrical vertices, faces, and edges in a 3D coordinate system to represent the virtual objects. These models can then be manipulated using computers to, for example, simulate physics, design aesthetic actions such as poses or other deformations, crate lighting, coloring and paint, or the like, of characters or other elements of a computer animation display.

One core functional aspect of computer graphics is to convert geometric and/or mathematical descriptions of objects into images. This process is known in the industry as "rendering." For movies, other animated features, shorts, and special effects, a user (e.g., a skilled computer graphics artist) can specify the geometric or mathematical description of objects such as characters, props, backgrounds, or the like, as models to be used in the rendered image or animation sequence. In some instances, the geometric description of an object may include a number of animation control variables (avars) and values for the avars. An animator may also pose the objects within the image or sequence and specify motions and positions of the objects over time to create an animation.

As such, the production of CGI and computer-aided animation may involve the extensive use of various computer graphics techniques to produce a visually appealing image from the geometric description of an object that may be used to convey an essential element of a story or provide a desired special effect. One of the challenges in creating these visually appealing images can be the balancing of a desire for a highly-detailed image of a character or other object with the practical issues involved in allocating the resources (both human and computational) required to produce those visually appealing images.

In particular, most characters, such as humans or animals, have some kind of hair or fur on their bodies. It has been noted that human vision is very sensitive to the appearance of hair and can detect subtle inaccuracies in its appearance. Moreover, since hair can provide a very personal expression of style and creativity, hair is often considered one of the most important customization features for avatars, such as for online social communities and gaming networks. On the other hand, rendering hair is not a trivial matter as it is computationally expensive to model the complex behavior of light scattering events in a volume of hair. While there has been much research on hair shading using physical models, it is difficult for computer graphics rendering to benefit from such research because it can be difficult for artists and other creative professionals to manipulate the rendering parameters, e.g., physical material properties such as indices of refraction and absorption coefficients, to achieve a specific aesthetic goal.

Thus, while physically based shading models can provide realistic and aesthetically pleasing results, they are often inappropriate for creative works due to their complexity. As a result, ad-hoc shaders that are computationally less expensive have become common in production use. However, such ad-hoc shaders lack the richness of detail provided by physical shaders, thereby providing a sub-optimal aesthetic appearance that may also break down in certain lighting conditions.

Accordingly, there is a need to overcome the drawbacks and deficiencies in the art by providing a three-dimensional computer graphics rendering system capable of producing aesthetically pleasing results for features such as hair while providing intuitive manipulation controls for art direction.

BRIEF SUMMARY

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

Systems, devices, and methods are provided for rendering images of hair using a statistical light scattering model for hair that approximates ground truth physical models. The model is significantly faster than other implementations of the Marschner hair model. The statistical light scattering model includes all the features of Marschner such as eccentricity for elliptical cross-sections. The model further extend the Marshner model by adding azimuthal roughness control, consideration of natural fiber torsion, and full energy preservation. Adaptive Importance Sampling (AIS) is specialized to fit easily sampled distributions to bidirectional curve scattering density functions (BCSDFs) of the model.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION

Figure 1:
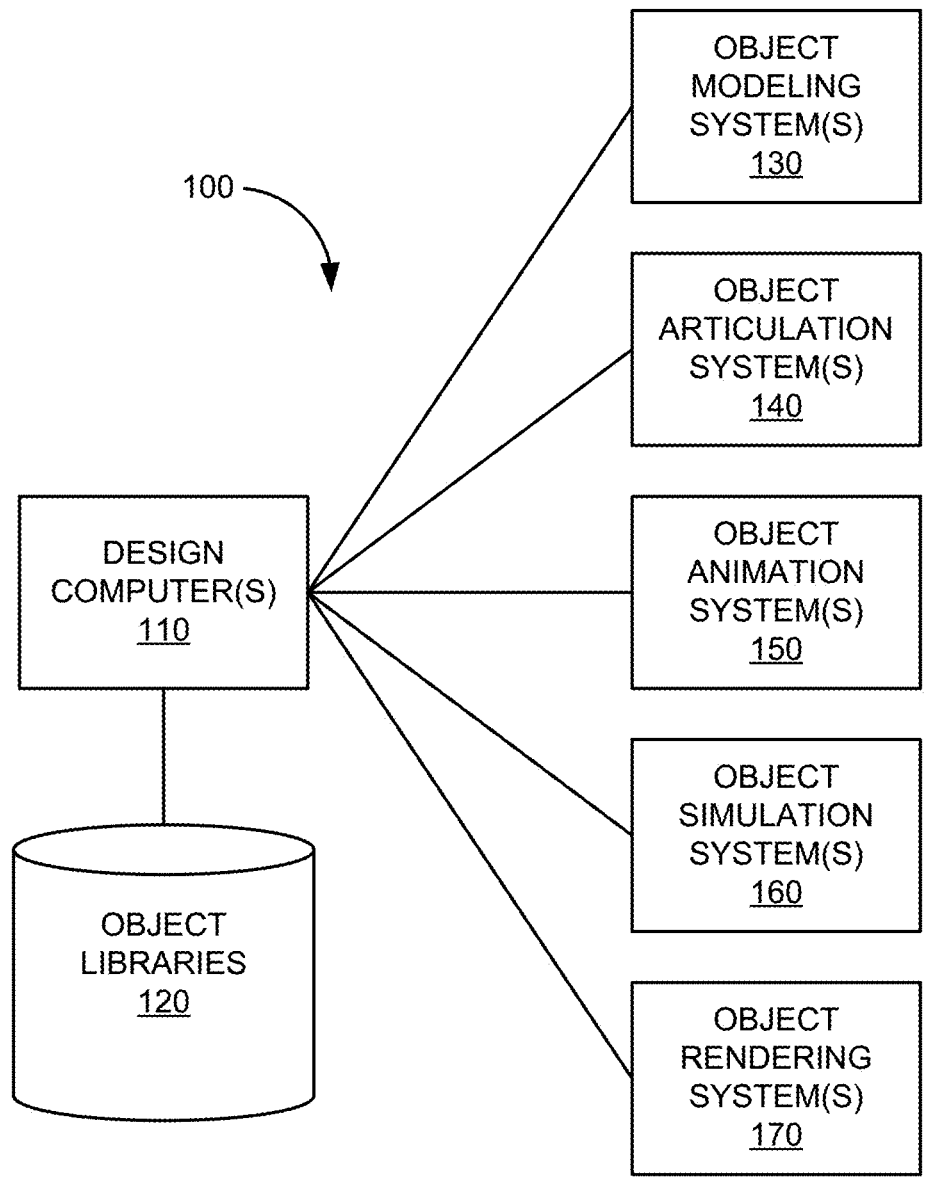
FIG. 1 is a simplified block diagram of a system for creating computer graphics imagery (CGI) and computer-aided animation that may implement or incorporate various embodiments or techniques for generating a data-driven light scattering model.

Realistic computer-generated images of characters often require rendering of the hair or fur of characters, which contribute to the style and personality of the characters. Systems, devices, and methods in the disclosure are described in relation to the particular example of hair or fur. It will be apparent to one of skill in the art that the disclosure may also be applied to other objects.

I. INTRODUCTION

Hair and fur have become important visual features that are increasingly common in production environments. Achieving realism means confronting many challenges inherent in the structure and behavior of hair. Most research effort on hair has gone toward modeling and animating the geometry of a collection of fibers. Fibers can be used as the building blocks for accurate rendering of seemingly unrelated effects such as clothing, where individual fibers of yarn may be modeled. In these cases, standard surface reflection algorithms no longer apply directly, since a hair fiber does not have a surface normal in the conventional sense, but only an orientation or tangent direction.

Less attention has been put toward scattering models that determine the appearance of a particular assembly of fibers. One type of model is designed to capture the most obvious feature of scattering from a fiber—namely the appearance of a linear highlight in the image running perpendicular to the fiber directions. This type of model is based on the observation that the reflection of a parallel beam from the surface of a cylinder will be in a cone centered on the hair axis. The model places a constant-intensity highlight centered on that cone. All other scattering is accounted for by a diffuse term that produces radiance proportional to the cosine of the incident angle. Although it has served well for many years, this type of model falls short in several respects. For one thing, it is not energy conserving, which is important for physically based rendering. For another, fibers are modeled as opaque cylinders, thus, the model does not account for transmission or internal reflection. For many years, the standard hair reflection model was the extension of the Phong model proposed by [Kajiya and Kay 89]. This model was adapted for production by [Goldman 97].

In 2003, [Marschner et al. 03] proposed a more comprehensive physically based light scattering model from human hair fibers. This Marschner model has become the basis for most subsequent work. While the Marschner model defines an effective hair bidirectional reflectance distribution function (BRDF), efficient Monte Carlo rendering using the model also requires practical techniques for importance sampling (e.g., importance sampling [Lawrence et al. 04] within a multiple importance sampling framework [Veach and Guibas 95]). In the comprehensive work by [d'Eon et al. 11], some issues of energy conservation were addressed thereby modifying the BRDF of the Marschner model. However, the resulting d'Eon model is fundamentally different in form from the original Marschner model, e.g., different Gaussian lobes, and may not correspond to the physical characteristics of light reflection based on microfacets.

A data-driven light scattering model is provided as an implementation of the Marschner model. For at least some of the components of light scattering, e.g., transmission-reflection-transmission (TRT), the data-driven light scattering model makes use of a version of Adaptive Importance Sampling (AIS), specialized to fit easily sampled distributions to Bidirectional Curve Scattering Distribution Functions (BCSDFs) used to simulate the light interactions with individual hair fibers. Accordingly, all the features of Marschner model are included, such as eccentricity for elliptical cross-sections. The Marschner model is also extended by adding azimuthal roughness control, consideration of natural fiber torsion, as well as fully energy preservation. Thus, a simple and practical sampling scheme is disclosed for a predetermined number of the components of light scattering of the Marschner hair model, some of which use AIS and others which can be sampled and normalized directly.

II. LIGHT SCATTERING MODELING SYSTEM

A system is first described for creating computer graphics imagery (CGI) and computer-aided animation using the data-driven light scattering model. An overall workflow using the system may include hair definition, creating a set of basis distributions, and light simulation using the basis distributions and adaptive importance sampling that generates shading data for given poses. For hair definition, information regarding structure and material properties of a hair object is received in a computer or computing system. The set of basis distributions is created for given incoming light directions by random sampling scattering. Shading data for an object can be generated using light simulation based on basis distributions to estimate scattering using adaptive importance sampling for a given outgoing light direction. Once generated, the shading data may be used by a renderer to create images of the object.

FIG. 1 is a simplified block diagram of system 100 for creating computer graphics imagery (CGI) and computer-aided animation using the data-driven light scattering model. System 100 includes design computer(s) 110, object libraries 120, object modeler system(s) 130, object articulation system(s) 140, object animation system(s) 150, object simulation system(s) 160, and object rendering system(s) 170. FIG. 1 and other figures are illustrative of embodiments or implementations disclosed herein and should not limit the scope of any claim. One of ordinary skill in the art may recognize through this disclosure and the teachings presented herein other variations, modifications, and/or alternatives to those embodiments or implementations illustrated in the figures. The devices in system 100 can include hardware and/or software elements.

Design computer(s) 110 can include hardware and software elements configured for designing CGI and assisting with computer-aided animation. Design computer(s) 110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like.

Design computer(s) 110 may be used at various stages of a production process (e.g., pre-production, designing, creating, editing, simulating, animating, rendering, post-production, etc.) to produce images, image sequences, motion pictures, video, audio, or associated effects related to CGI and animation. As an example, a user of design computer(s) 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In one embodiment, design computer(s) 110 can be used to model hair and fur. A user may define parameters for the data-driven light scatting model hair model. Some examples of parameters are hair parameters, e.g., color, eccentricity, curl, shape, or size, and scattering functions, e.g., longitudinal and azimuthal scattering functions.

In another example, a user of design computer(s) 110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 110 acting as an animator may employ one or more systems or tools to specify motion and position of one or more objects over time to produce an animation.

Object libraries 120 can include hardware and/or software elements configured for storing and accessing information related to objects used by design computer(s) 110 during the various stages of a production process to produce CGI and animation. Some examples of object libraries 120 can include a file, a database, or other storage devices and mechanisms. Object libraries 120 may be locally accessible to design computer(s) 110 or hosted by one or more external computer systems.

Some examples of information stored in object libraries 120 can include an object itself, metadata, object geometry, object topology, rigging, control data, animation data, animation cues, simulation data, texture data, lighting data, shader code, or the like. An object stored in object libraries 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

In one embodiment, object libraries 120 are used to store model parameters, such as hair definition parameters and scattering functions. Object libraries 120 can also store pre-computed information, such as a mapping between user-specified parameters for the model and those of a mixture distribution determined using adaptive importance sampling (AIS).

Object modeling system(s) 130 can include hardware and/or software elements configured for modeling one or more computer-generated objects. Modeling can include the creating, sculpting, and editing of an object. Object modeling system(s) 130 may be invoked by or used directly by a user of design computer(s) 110 and/or automatically invoked by or used by one or more processes associated with design computer(s) 110. Some examples of software programs embodied as object modeling system(s) 130 can include commercially available high-end 3D computer graphics and 3D modeling software packages 3D STUDIO MAX and AUTODESK MAYA produced by Autodesk, Inc. of San Rafael, Calif.

Object modeling system(s) 130 may be configured to generate a model to include a description of the shape of an object. Object modeling system(s) 130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

Object modeling system(s) 130 may further generate model data (e.g., 2D and 3D model data) for use by other elements of system 100 or that can be stored in object libraries 120. Object modeling system(s) 130 may be configured to allow a user to associate additional information, metadata, color, lighting, rigging, controls, or the like, with all or a portion of the generated model data. In one embodiment, object modeling system(s) 130 can generate a statistical hair scattering model using adaptive Importance Sampling (AIS) specialized to fit easily sampled distributions to bidirectional curve scattering density functions (BCSDFs). The statistical hair scattering model can includes all the features of Marschner such as eccentricity for elliptical cross-sections, and extends them by adding azimuthal roughness control, and consideration of natural fiber torsion.

Object articulation system(s) 140 can include hardware and/or software elements configured to articulating one or more computer-generated objects. Articulation can include the building or creation of rigs, the rigging of an object, and the editing of rigging. Object articulation system(s) 140 may be invoked by or used directly by a user of design computer(s) 110 and/or automatically invoked by or used by one or more processes associated with design computer(s) 110. Some examples of software programs embodied as object articulation system(s) 140 can include commercially available high-end 3D computer graphics and 3D modeling software packages 3D STUDIO MAX and AUTODESK MAYA produced by Autodesk, Inc. of San Rafael, Calif.

Object articulation system(s) 140 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton). Object articulation system(s) 140 may further generate articulation data (e.g., data associated with controls or animations variables) for use by other elements of system 100 or that can be stored in object libraries 120. Object articulation system(s) 140 may be configured to allow a user to associate additional information, metadata, color, lighting, rigging, controls, or the like, with all or a portion of the generated articulation data.

Object animation system(s) 150 can include hardware and/or software elements configured for animating one or more computer-generated objects. Animation can include the specification of motion and position of an object over time. Object animation system(s) 150 may be invoked by or used directly by a user of design computer(s) 110 and/or automatically invoked by or used by one or more processes associated with design computer(s) 110. Some examples of software programs embodied as object animation system(s) 150 can include commercially available high-end 3D computer graphics and 3D modeling software packages 3D STUDIO MAX and AUTODESK MAYA produced by Autodesk, Inc. of San Rafael, Calif.

Object animation system(s) 150 may be configured to enable users to manipulate controls or animation variables or utilized character rigging to specify one or more key frames of animation sequence. Object animation system(s) 150 may generate intermediary frames based on the one or more key frames. Object animation system(s) 150 may be configured to enable users to specify animation cues, paths, or the like according to one or more predefined sequences. Object animation system(s) 150 may generate frames of the animation based on the animation cues or paths. Object animation system(s) 150 may be configured to enable users to define animations using one or more animation languages, morphs, deformations, or the like.

Object animation system(s) 150 may further generate animation data (e.g., inputs associated with controls or animations variables) for use by other elements of system 100 or that can be stored in object libraries 120. Object animation system(s) 150 may be configured to allow a user to associate additional information, metadata, color, lighting, rigging, controls, or the like, with all or a portion of the generated animation data.

Object simulation system(s) 160 can include hardware and/or software elements configured for simulating one or more computer-generated objects. Simulation can include determining motion and position of an object over time in response to one or more simulated forces or conditions. Object simulation system(s) 160 may be invoked by or used directly by a user of design computer(s) 110 and/or automatically invoked by or used by one or more processes associated with design computer(s) 110. Some examples of software programs embodied as object simulation system(s) 160 can include commercially available high-end 3D computer graphics and 3D modeling software packages 3D STUDIO MAX and AUTODESK MAYA produced by Autodesk, Inc. of San Rafael, Calif.

Object simulation system(s) 160 may be configured to enables users to create, define, or edit simulation engines, such as a physics engine or physics processing unit (PPU/ GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. Object simulation system(s) 160 may be used to simulate the behavior of objects, such as hair, fur, and cloth, in response to a physics model and/or animation of one or more characters and objects within a computer-generated scene.

Object simulation system(s) 160 may further generate simulation data (e.g., motion and position of an object over time) for use by other elements of system 100 or that can be stored in object libraries 120. The generated simulation data may be combined with or used in addition to animation data generated by object animation system(s) 150. Object simulation system(s) 160 may be configured to allow a user to associate additional information, metadata, color, lighting, rigging, controls, or the like, with all or a portion of the generated simulation data.

Object rendering system(s) 170 can include hardware and/or software element configured for "rendering" or generating one or more images of one or more computer-generated objects. "Rendering" can include generating an image from a model based on information such as geometry, viewpoint, texture, lighting, and shading information. Object rendering system(s) 170 may be invoked by or used directly by a user of design computer(s) 110 and/or automatically invoked by or used by one or more processes associated with design computer(s) 110. One example of a software program embodied as object rendering system(s) 170 can include PhotoRealistic RenderMan, or PRMan, produced by Pixar Animations Studios of Emeryville, Calif.

Object rendering system(s) 170 can be configured to render one or more objects to produce one or more computer-generated images or a set of images over time that provide an animation. Object rendering system(s) 170 may generate digital images or raster graphics images. A rendered image can be understood in terms of a number of visible features. Some examples of visible features that may be considered by object rendering system(s) 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

Object rendering system(s) 170 may further render images (e.g., motion and position of an object over time) for use by other elements of system 100 or that can be stored in object libraries 120. Object rendering system(s) 170 may be configured to allow a user to associate additional information or metadata with all or a portion of the rendered image.

System 100 may include one or more hardware elements and/or software elements, components, tools, or processes, embodied as design computer(s) 110, object libraries 120, the one or more object modeler systems 130, object articulation system(s) 140, object animation system(s) 150, object simulation system(s) 160, and/or object rendering system(s) 170 that provide one or more tools for shading hair and fur using the data-driven light scattering model. System 100 can generate and use a data-driven light scattering model as an implementation of the Marschner model. The data-driven light scattering model makes use of a version of Adaptive Importance Sampling (AIS), specialized to fit easily sampled distributions to Bidirectional Curve Scattering Distribution Functions (BCSDFs) used to simulate the light interactions with individual hair fibers. All the features of Marschner model are included, such as eccentricity for elliptical cross-sections. The Marschner model is also extended by adding azimuthal roughness control, consideration of natural fiber torsion, as well as fully energy preservation.

III. DATA-DRIVEN LIGHT SCATTERING MODEL

Research into biological and physical properties of hair fibers, usually with application in cosmetics, has helped to produce more accurate hair renders. For one example, [Robbins 2012] describes hair fiber shape as depending on the cross-sectional distribution of different types of cortical cells, causing some hair types to both bow out in an ellipse and curl about their tangent axis. Elliptical cross-sections can have large impacts on the resulting scattering function. Yet as long as computing time is a scarce resource, a painters illusion [Kajiya and Kay 1989]-implied detail higher than actual resolution—is desired over potentially costly modeling of individual fibers. This often leads to approximation and simplification such as in [Goldman 1997], [Sadeghi et al. 2010]. At a loss of accuracy, such models often experience runtime reductions and suffer from less numerical instability.

In one embodiment, system 100 is used to rigorously define the physical properties of hair and light scattering. System 100 utilizes specialized algorithms to reduce complexity to a space of salient visual features. Efficient importance sampling of scattering functions helps to reduce computation time by concentrating rays on high-energy areas. By following the groundwork laid out in [Hery and Ramamoorthi 2012], optimal importance sampling is performed with uniform weights. Searching for less intensive sampling alternatives, such as [Ou et al. 2012] found for Gaussian lobes, increases efficiency by reducing the cost of sampling.

Additionally, system 100 is used to define scattering functions that are energy conserving. Without it, changing model parameters can have unintended and unforeseen effects. [d'Eon et al. 2011] first demonstrated and solved energy loss at grazing angles for the original formulation of [Marschner et al. 2003]. In one embodiment, a white furnace test is applied to all lobes as in [Hery and Ramamoorthi 2012] to directly observe preservation of energy. Such a test has since been rigorously justified for microfacet BRDFs [Heitz 2014].

A. Hair Definition

Figure 2:
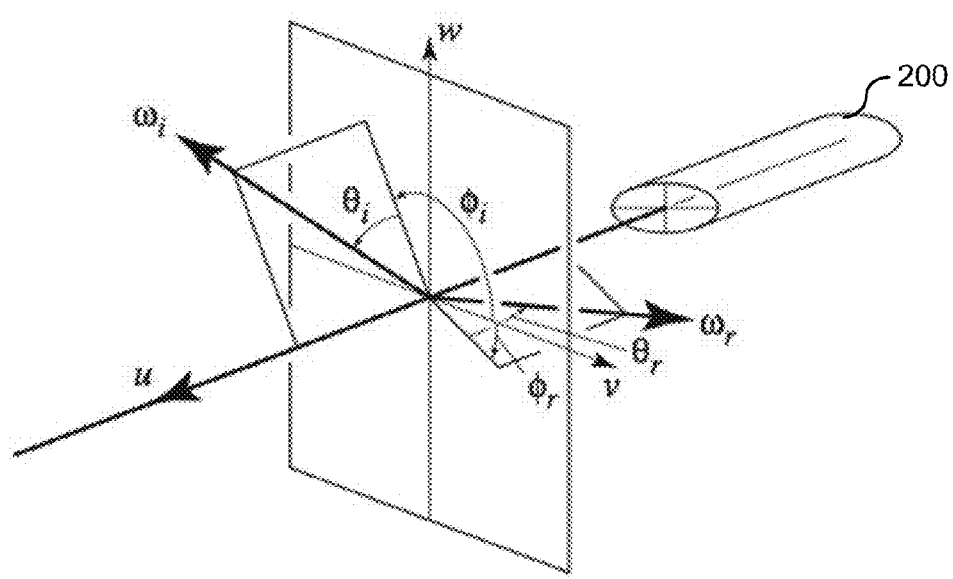
FIG. 2 is a simplified flowchart of a method for shading an elliptical object in one embodiment.

A mathematical foundation for the data-driven light scattering model comes from [Marschner et al. 2003] using an approach called factored-lobe BCSDF coined by [d'Eon et al. 2013]. In order to properly treat hair curl, the spherical coordinate system in [Marschner et al. 2003] is extended to be both locally well-defined and globally consistent. FIG. 2 is an illustration of elliptical hair fiber 200 and associated coordinate system that may be used with respect to embodiments of light scattering models disclosed herein. In this example, three orthonormal vectors form a right-handed basis: u—the tangent vector, v—the major axis, bisecting the thickest cross-section, and w—the minor axis orthogonal to the others. As scattering functions produced by elliptical hair fibers are not rotationally invariant, v is distinguished from w. Global consistency follows from defining both u and v from hair geometry, and requiring v to be a smoothly varying function of its distance from the root of the hair fiber.

With this reference, the goal of lighting hair 200 is to solve the light transport equation:

$$L_r(\omega_r) = \int L_i(\omega) S(\omega, w_r | \beta) V(\omega) \cos(\theta) / \cos^2(\theta_r) d\omega$$

where $L_r$ is the outgoing radiance from a point $\omega, \Sigma \mathcal{R}^3$ calculated as an integral of incoming radiance, $L_i$, over all incoming light directions. The remaining functions are V, a visibility indicator to determine if a light source is occluded at $\omega_r$, cos terms to account for change of measure into spherical coordinates, and S a scattering function. The function S contains the distributional properties of how light scatters at $\omega_r$, and is primarily determined by characteristics of the object under light.

With a given incoming light direction $\omega_i$, random scattering can be sampled as $\omega_o$ to solve the light transport equation. Both directions are described by their longitudinal and azimuthal angles:

$$(\theta, \phi) \in [-\pi/2, \pi/2] \times [-\pi, \pi]$$

The scattering function S is defined as differential radiance (r) over differential energy and described by a sum over all internal bounces resulting in the emission of a light ray—(R)eflection, (T)ransmission (T)ransmission, TRT, TRRT, and so forth as illustrated below:

$$S(\omega_i, \omega_r) = \frac{dL_r(\omega_r)}{dL_i(\omega_i)} = \sum_{\rho \in \{R, TT, TRT, \ldots\}} S_\rho(\theta_i, \phi_i, \theta_r, \phi_r)$$

As in [Marschner et al. 2003], any terms after the first three may be discarded. Note that [d'Eon et al. 2011] showed that for light colored hair, there is non-negligible energy, particularly at grazing angles in higher terms. Extending the model to higher bounces however is relatively straightforward. Embodiments separate the third term or bounce into at least two terms, TRT and GLINT, treating the singularities caused by three bounces separately p E {R,TT, TRT,GLINT}. This seemed reasonable given the suggestion in [Marschner et al. 2003] to treat attenuation differently for each case.

Each $S_\rho$ term can be partitioned into the product of a marginal, longitudinal scattering function M and a conditional, azimuthal scattering function N. Both products are further conditioned on incoming angles and a vector of user-defined parameters β as follows in equation (1):

$$S_R(\theta_i,\phi_i,\theta_r,\phi_r)=M_R(\theta_i|\theta_r,\phi_r,\beta)N_R(\phi_i|\theta_i,\theta_r,\phi_r,\beta)$$

Note that the partition in (1) is completely general and could be used to partition any joint scattering function of n variables into a product of 1 marginal and n−1 conditionals, all 1 dimensional. Table 1 provides a list of user defined parameters β.

TABLE 1

| Parameter | Description | Typical Values |
|---|---|---|
| *Fiber properties* | | |
| C | RGB hair color vector | 0 to 1 |
| e | eccentricity, ratio minor to major cross-section axis | 0.85 to 1 |
| CD | average curl diameter, estimated from e | 0.20 to 45 |
| κ | gain Scattering function | 1 |
| ρ | lobe index | T, TT, TRT, GLINT |
| $\alpha_\rho$ | longitudinal shift. $\alpha_\rho$ in Marschner | |
| $\lambda_\rho$ | longitudinal width. $\beta_\rho$ in Marschner | |
| $\sigma_\rho$ | azimuthal width factor. $\sigma_{TRT} = \sigma_{GLINT}$ | 0.5 to 10 |
| β | Wrapper for user input parameters. | |
| *Basis distributions* | | |
| μ | mean value | −π to π |
| $\sigma_l, \sigma_r$ | left and right side widths (skew logistic) | 0 to ∞ |
| s | monomial exponent Adaptive importance sampling | 0 to 1 |
| h(f\|g) | distance function on densities f and g | $(g - f)^2$ |
| D | number of basis components | 3 to 5 |
| $p_d$ | basis component | monomial, skew logistic |
| ε | threshold for numerical optimization | 1e − 4 |

In certain embodiments, the BCSDF S is applied by first premultiplying by a term jointly accounting for Fresnel attenuation and volume absorption, $A_\rho(\theta_i, \phi_i, \theta_r, \phi_r, \beta)$, and then integrating incoming energy over all light directions as follows in equation (2):

$$L_r(\omega_r) = \int L_i(\omega)\tilde{S}(\omega, \omega_r | \beta)V(\omega)\cos(\theta)/\cos^2(\theta_r)d\omega$$

$$\tilde{S}(\omega, \omega_r | \beta) = \sum_\rho A_\rho(\omega, \omega_r, \beta)M_\rho(\theta | \omega_r, \beta)N_\rho(\phi | \theta, \omega_r, \beta)$$

In equation (2), V is a visibility function, and the cos terms account for solid angle change of measure. $L_r$ is estimated by importance sampling according to $\omega_i \sim S(\omega_i, \omega_r)$. Furthermore, $\theta_d=(\theta_r-\theta_i)2$, $\phi=\phi_r-\phi_i$, $\theta_h=(\theta_i+\theta_r)/2$ and e is the ratio of minor to major axis fiber diameters.

As in [Marschner et al. 2003] and [d'Eon et al. 2011], Fresnel attenuation is modeled at each internal scattering event. The corresponding product of reflection and refraction terms is taken as Fresnel for each scattering component. In other words, a $F_\rho$ for each $S_\rho$ term.

Volume absorption is a softened exponential decay in the angel of azimuthal reflectance as show in equation (3):

$$T_\rho(\theta, \phi) = e^{-\rho_\# \zeta(C)\left|\frac{\cos(\gamma)}{\cos(\theta_D)}\right|}$$

where $\rho_\#$ accounts for the increasing length of the internal light pathway in higher terms {R-0, TT-1, TRT-2, GLINT-2}, and γ=γ(φ) an approximation of the internal, azimuthal angle of reflection given incident and outgoing angles. The term ζ(C) matches overall wavelength to a user supplied color, C, when the rest of the exponent is maximized.

The distribution of cortical cells in a hair fiber cross-section affect how much fibers curl in on themselves. [Robbins 2012] provides that a distribution of cells in symmetric, concentric circles produces straight hair, while asymmetric distributions produce curly hair. This distribution of cell types also creates eccentricity. More asymmetry results in both curlier and more eccentric fibers. Curl will thus affect light scattering as the position of fiber axis relative to camera direction rotates down the length of the hair.

The model achieves a perception of fiber twisting without modifying hair geometry by defining $\phi_0(l)$, the rotation of hair major axis as a function of distance from the root, l. The underlying assumption is that $\phi_0$ rotates 360° for every full curl a fiber completes, and any partial curls induce proportional partial rotation. It would be onerous to ask an artist to input the number of curls completed for every hair fiber. Instead, reasonable values are estimated from eccentricity. The STAM is a robust classification of human hair into 8 curl types from over 1,500 subjects spanning 18 different racial subgroups. [De La Mettrie et al. 2007] STAM is also very correlated with eccentricity. [Robbins 2012] regressed curl type as a function of eccentricity, explaining over 99.9% of the variation in curl type across numerous sources. The STAM is inverted to compute a predicted curl diameter from eccentricity, denoted CD(e).

If we let $C_l$ denote the proportion of curl completed at l, the equation for $\phi_0$ is:

$$\phi_0(l; e) = 2\pi C_l = \frac{2l}{CD(e)}(\text{mod}2\pi).$$

B. Light Scattering Functions

The parameter set of the hair has an impact of the scattering of light. A Gaussian lobe is a natural approximation to the aggregate impact of microfacet roughness on the scattering of light. The impact of many small, rough displacements on a system results in a bell curve of outputs in great generality. Unfortunately, true Gaussian sampling is costly, especially in the case of hair reflectance, as there must be samples from a finite range of longitudinal angles. As shown in [Hery and Ramamoorthi 2012], this range depends on the reflected direction, is different for each light ray, and non-symmetric. With no closed form solutions for the Gaussian CDF, these complications are costly.

One scattering function used for longitudinal scattering in some embodiments of the model as shown in equation (4):

$$M_\rho(\theta|\omega_r,\beta)=l(\theta_h;\alpha_\rho,\lambda_\rho)$$

where $\alpha_\rho$ and $\lambda_\rho$ are the longitudinal offset and cone width.

The logistic functional form follows in Table 2.

TABLE 2

| Name | Functional Form |
|---|---|
| *Distributions* | |
| Logistic | $l(\theta_h; \mu, \sigma) = e^{\frac{\theta_h - \mu}{\sigma}} / \sigma\left(1 + e^{\frac{\theta_h - \mu}{\sigma}}\right)^2$ |
| Skew Logistic | $p_{sl}(\phi; \mu, \sigma_l, \sigma_r) =$ $\phi_l l(\phi; \mu, \sigma_l) 1_{\phi \leq \mu} \sigma_r l(\phi; \mu, \sigma_r) 1_{\phi > \mu}$ |
| Monomial | $p_w(\phi; \mu, s) = \frac{1}{s+1}(\phi - \mu)^s$ |
| *Others* | |
| Indicator of set A | $1_A$ |
| $N_{TT}$ scale approximation | $s(\theta_D) = -\frac{\pi}{2}(1 - \eta(\theta_D)^{-1})\log(2d - 1 - 2\sqrt{d(d-1)})$ $d = (\sqrt{2} - \tau)/(1 - \tau)$ $\tau = \operatorname{asin}(\eta(\theta_D)^{-1})$ |

As longitudinal scattering is only one part, azimuthal scattering functions for, $N_R$, $N_{TT}$, $N_{TRT}$ and $N_{GLINT}$, which follow the physics of light refraction through a semi-transparent cylinder as defined in [Marschner et al. 2003] also need to be found. These functions also need to retain easily sampled functional forms. A form is easily sampled if it has an invertible, closed-form definite integral, or is a linear combination of such forms. The first term, $N_R$, can be solved analytically as a cosine. This form is well studied in the literature, an efficient sampling schemes is described in [Hery and Ramamoorthi 2012].

The others do not have easily sampled solutions. [d'Eon et al. 2013] has a sampling scheme that circumvents the need for invertibility, but their approach does not handle extension to elliptical fibers, and can be very costly. The second, $N_{TT}$, depends on the longitudinal $\theta$ only through its cone width, and can be shown to be symmetric about $-\pi$ with domain $[0, 2\pi]$. Following the results of the previous section, $N_{TT}$ can be approximated by a logistic distribution, with cone angle a function of $\theta_D$ found by Taylor approximation (see table 2).

Embodiments provide a data-centric approach to light scattering that handle extension to elliptical fibers without expensive demands. Let be a parameter vector defining the shape of $N_\rho$. The components of $\beta_\rho$ for each $\rho$ are listed in Table 1 above. Consider a set of basis densities, $p_d(\phi, b_d)$, with $b_d$ parameters for $\rho_d$, and $\alpha_d$ non-negative weights, for d=1, . . . ; D. Then for any sample of azimuthal offsets $\phi_j$, j=1, . . . , n, and suitable distance metric h on $\mathcal{F}$, the space of distributions, h: $\mathcal{F} \times \mathcal{F} \times [-\pi, \pi] \rightarrow \mathcal{R}_+$, one could directly solve the optimization in equation (5):

$$a*, b* \in \operatorname{argmin}\{a, b\}_{d=1}^D$$

$$\sum_{j=1}^n h\left(N_\rho(\phi_j | \beta_\rho) \middle| \left| \sum_{d=1}^D a_d p_d(\phi_j; b_d) \right| N_\rho(\phi_j | \beta_\rho) \right)$$

s.t. $a_d \geq 0$, $b_d \in B$, with B a possible set of constraints on b.

Accordingly, an explicit solution is provided for $N_\rho$ as follow:

$$N_R(\phi | \sigma_R) = \frac{1}{4\sigma_R}\cos\left(\frac{\phi}{2\sigma_R}\right)$$

$$N_{TT}(\phi | \theta_d, \sigma_{TT}) = l(\phi; \pi, s(\theta_d)\sigma_{TT})$$

$$N_{TRT}(\phi | \beta_{TRT}) = \sum_{d=1}^5 a_{TRT,d}(\beta_{TRT}) p_{TRT,d}(\phi | b_d(\beta_{TRT}))$$

$$N_{GLINT}(\phi | \beta_G) = \sum_{d=1}^3 a_{GLINT,d}(\beta_G) p_{GLINT,d}(\phi | b_d(\beta_G))$$

IV. OBJECT RENDERING USING DATA-DRIVEN LIGHT SCATTERING MODEL

Figure 3:
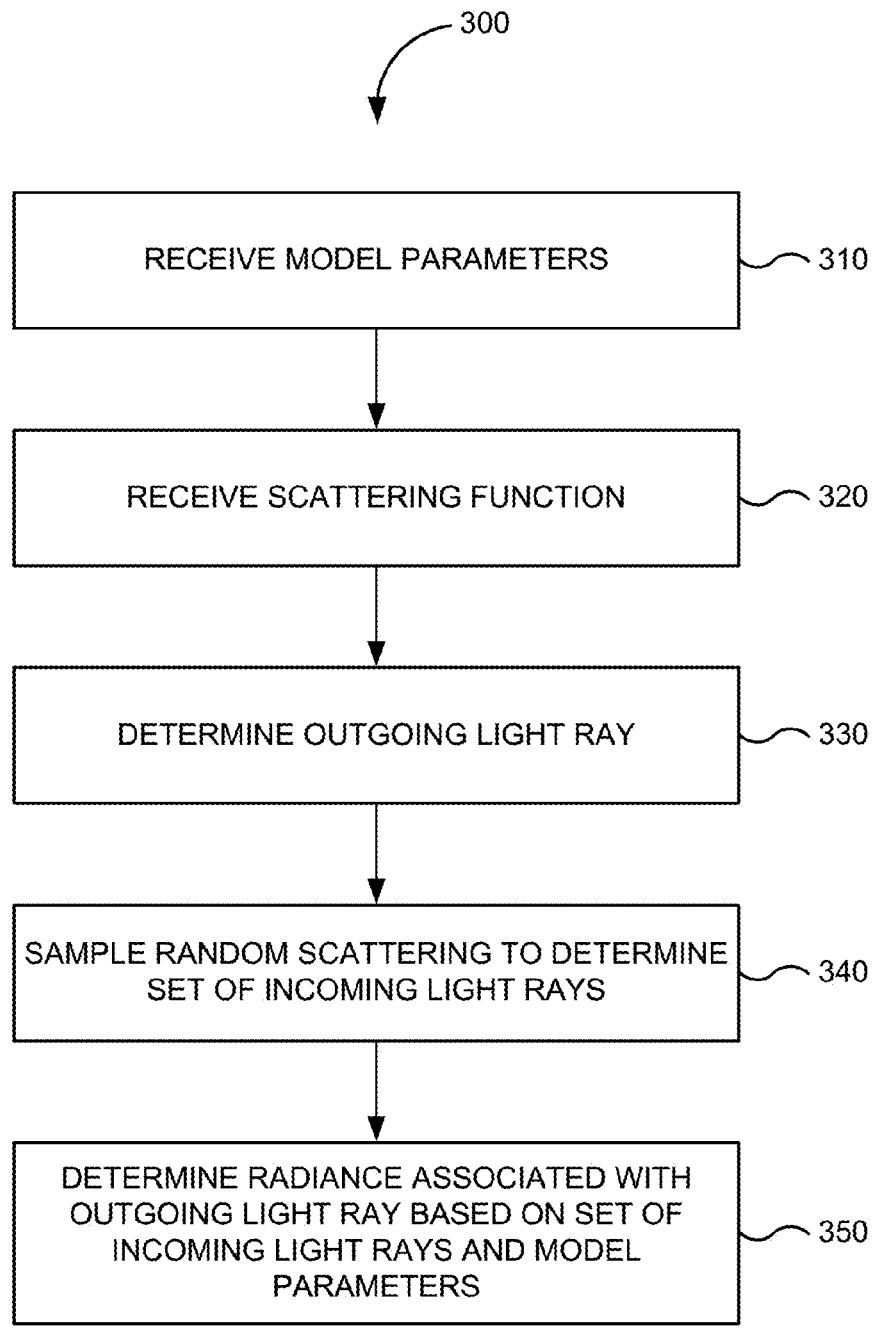
FIG. 3 is an illustration of an elliptical hair fiber and associated coordinate system that may be used with respect to embodiments of light scattering models disclosed herein.

FIG. 3 is a simplified flowchart of method 300 for shading an elliptical object in one embodiment. Implementations of or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In step 310, model parameters are received. Model parameters can include geometry, topology, connectivity, rigging, avars, controls, material properties, lighting properties, or the like. With respect to the data-driven light scattering model, table 1 provides a list of user defined parameters $\beta$, which include fiber properties such as color, eccentricity, curl, gain.

In step 320, a scattering function is received. The scattering function contains the distributional properties of how light scatters at a given point as primarily determined by characteristics of an object under light (e.g., the received model parameters). As an example, longitudinal scattering can be specified using equation 4. Azimuthal scattering can be specified using equation 5, e.g., with a different representation for component $N_\rho$.

In step 330, an outgoing light ray is determined. The outgoing light ray may be associated with a camera view, a resulting pixel, or the like. In step 340, random scattering is sampled to determine a set of incoming light rays. The set of incoming light rays represent the light rays from light sources, such as ambient light or directional light, which are determined to contribute to the outgoing light ray (e.g. incoming light rays that contribute to {R, TT, TRT, GLINT} of the outgoing light ray).

In step 350, radiance associated with the outgoing light ray is determined based on the set of incoming light rays and the model parameters. In one embodiment, an average of the energy contribution that each light ray makes to each component {R, TT, TRT, GLINT} may be determined as the outgoing radiance.

Figure 4:
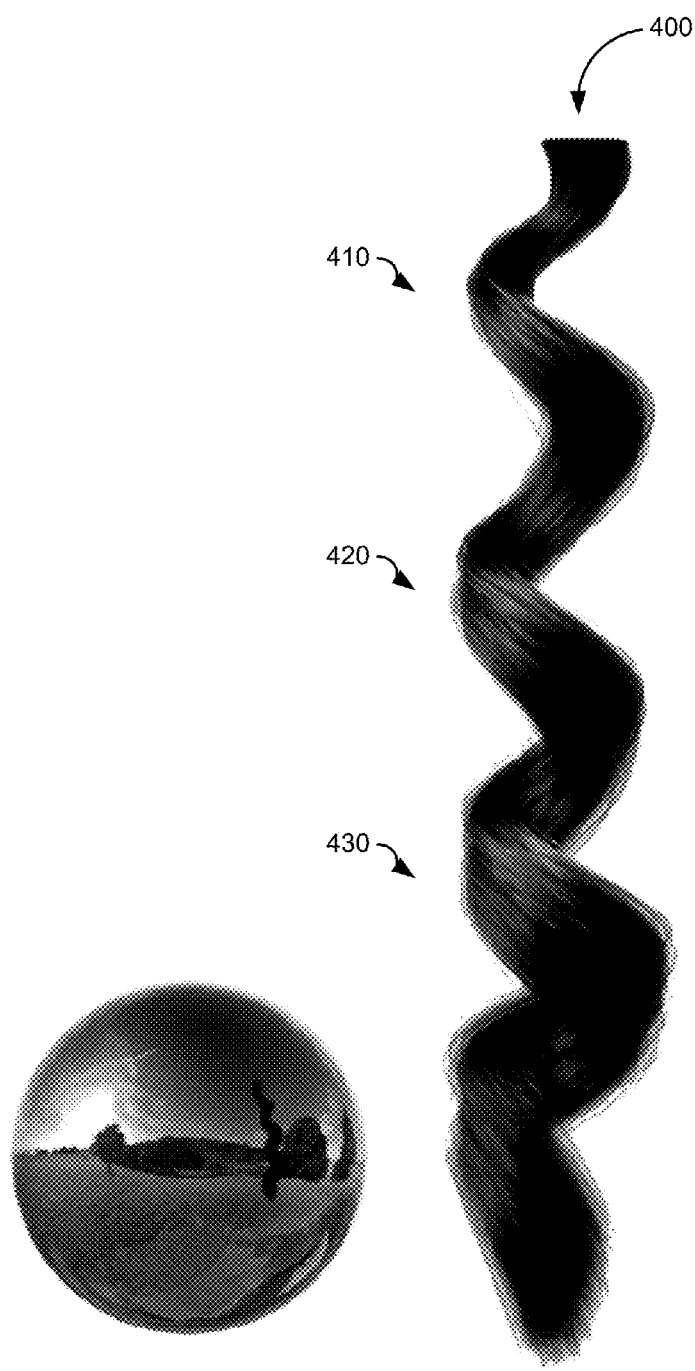
FIG. 4 is a snap-shot render from importance sampling hair using the model of the present disclosure.
Figure 5:
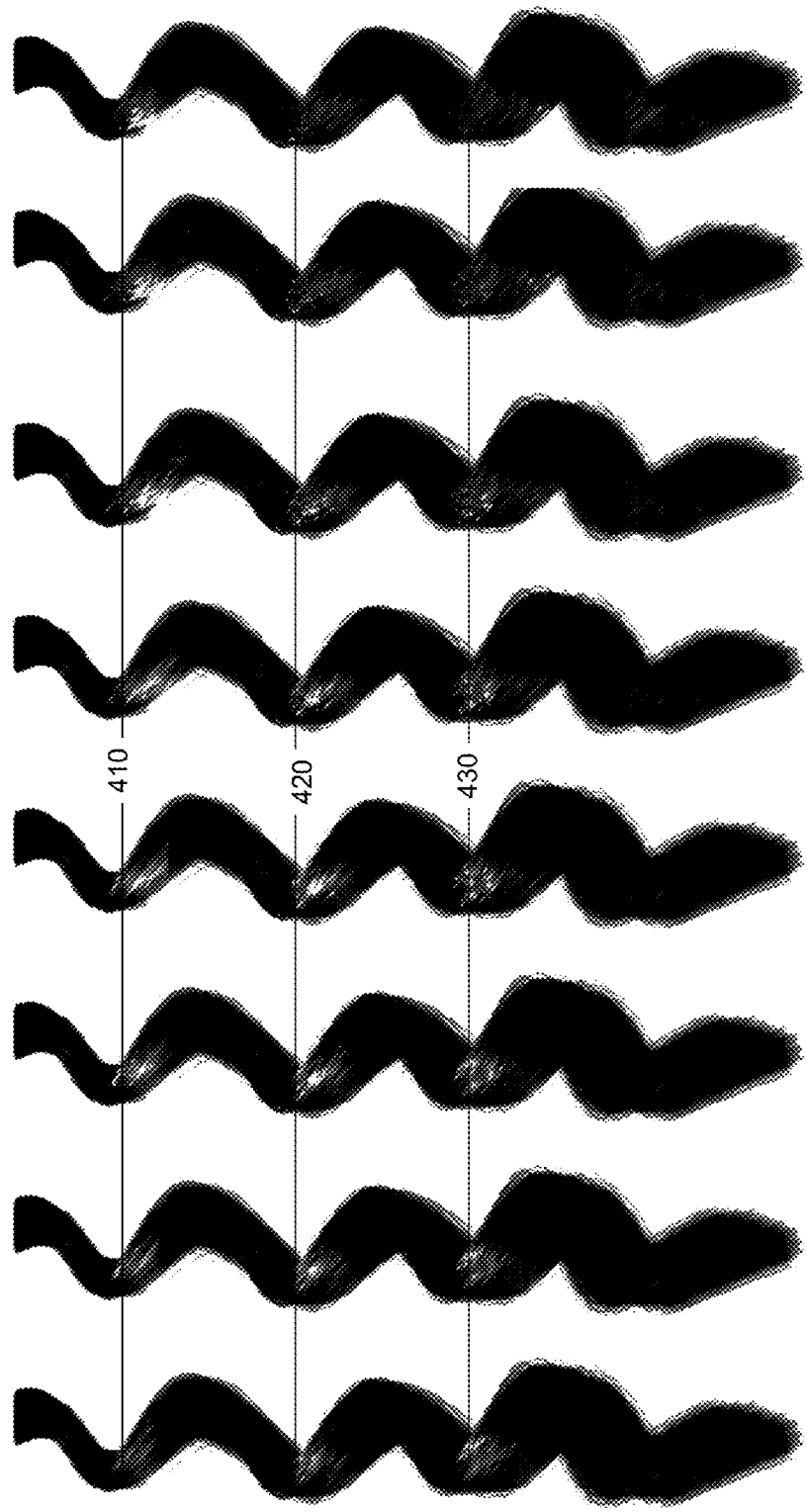
FIG. 5 is a series of snap-shot renders of the hair of FIG. 4.

FIG. 4 is a snap-shot render from importance sampling hair 400 using the model of the present disclosure. The model supports efficient and seamless rendering of fibers with elliptical cross section (see curls 410, 420, and 430). This is key to producing time-homogeneous, realistic caustics. FIG. 5 is a series of snap-shot renders of the hair of FIG. 4 produced by rotating an outdoor IBL gathered in midday, and using a ray tracer with multiple importance sampling.

Each image is approximately 64 light samples and 256 BRDF samples per pixel.

V. MODEL SOLVING OPTIMIZATION

The equation (5) has many local minima and is sensitive to initial conditions. An adaptive importance sampling (AIS) scheme can be repurposed to solve (5) as AIS mitigates sensitivity to initial conditions as the grid of $\phi_i$ is recomputed at every step and focused on the most important areas of g. Scalability is addressed by an explicit choice of h as L2 distance, which allows decoupling $a_d$s from $b_d$s. In various embodiments, AIS is used to solve equation (5) for ρ=TRT and GLINT. The basis distributions $\rho_d$ that worked well were a combination of skew logistics and monomials for TRT and solely skew logistics for GLINT. These distributions are defined in Table 2.

Figure 6:
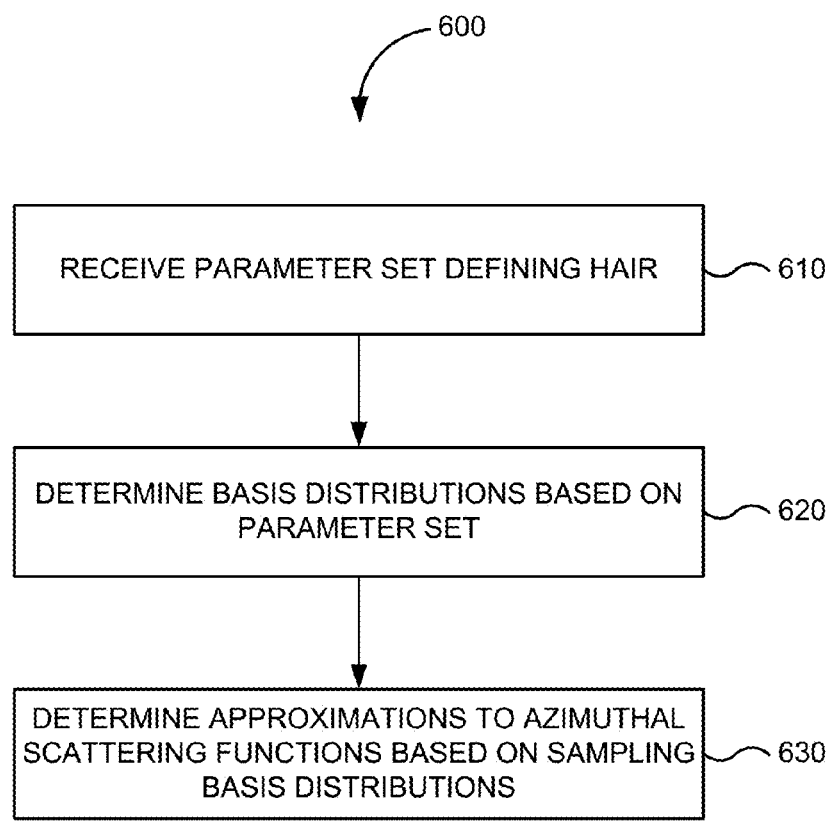
FIG. 6 is a flowchart of a method for fitting easily sampled distributions to BCSDFs.
Figure 7A:
FIGS. 7A, 7B, 7C, and 7D shows a comparison of four models for sampling hair, from top left to bottom right-ground truth path tracer, [Ou et al. 2012], [dEon et al. 2013], and the model of the present disclosure.
Figure 7B:
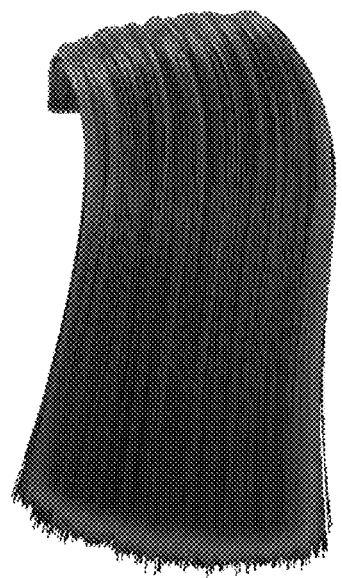
Figure 7C:
Figure 7D:
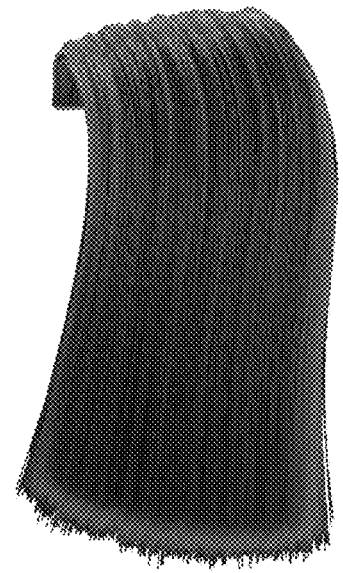

FIG. 6 is a flowchart of method 600 for fitting easily sampled distributions to BCSDFs. Implementations of or processing in method 600 depicted in FIG. 6 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In step 610, a parameter set defining hair. In step 620, determine basis distributions based on parameter set. For example, given an estimate of $\{a_1, b_1, \ldots, a_D, b_D\}$, set $$P_d = \int p_d(\phi; b_x) d\phi, \pi_d \propto a_d P_d$$

1: Compute sampling parameters $P_d$, $\pi_d$ for each d.

In step 630, approximations to the scattering functions are determined based on sampling the basis distributions. Here, sampling parameters $P_d$, $\pi_d$ for each d are computed. Next, $\phi$ is sampled from the mixture distribution as follows:

$$\phi_1, \ldots, \phi_m \sim \sum_{d=1}^{D} \pi_d p_d(\phi, b_d)/P_d$$

1: Sample $\phi$ from the mixture distribution. β is a vector of user supplied parameters.
2: float d=SAMPLE DISCRETE (D,$(\pi_1, \ldots, \pi_D)$)
3: float $b_d$=GET P PARAMS(β)
4: float $\phi$=SAMPLE FROM P(d,$b_d$)

Weights are then computed as:

$$\omega_i = \frac{g(\phi_i)}{\sum_{d=1}^{D} a_d p_d(\phi_i; b_d)} \bigg/ \sum_{j=1}^{m} \frac{g(\phi_j)}{\sum_{d=1}^{D} a_d p_d(\phi_j; b_d)}$$

For example:
1: for (int j=0;j<n; j+=1)
2: float $g_j$=G PDF($\phi_j$)
3: float $\omega_j$=$g_j/\Sigma_d a_d p_{dj}/\Sigma_j \omega_j$
4: end for The following is then solved:

$$\{a', b'\}_{d=1}^{D} \in \operatorname{argmin}\{a, b\}_{d=1}^{D} \sum_{i=1}^{m} h\left(g(\phi_i) \bigg\| \sum_{d=1}^{D} a_d p_d(\phi_i; b_d)\right) \omega_i$$

s.t. $a_d \geq 0, b_d \in B$.

1: For $h(g\|f)=(g-f)^2$, we can decouple $a_d$ and $b_d$ as follows.
2: With $g_i=g(\phi_i)$, $P_{ij}=p_i(\phi_j; b_i)$, $d^k P_{ij}=(\partial_k b_i)p_i(\phi_j;b_i)$, and A=DIAG(a), G=DIAG(g), etc.
3: gradient for b
4: array $\nabla_b$=-2(g-a$^t$P)WdPA
5: Hessian for b
6: matrix $H_b$=2(dPA)$^t$W(dPA)-2DIAG((g-a$^t$P)Wd$^2$PA)
7: float b=NEWTON STEPS($\nabla_b$,$H_b$)
8: Weighted regression of g on $p_d$ gives a
9: array a'=(P$^t$GP)$^{-1}$P$^t$Gg
This process is repeated until the weighted objective is below desired threshold, ε.
1: float O=0
2: for (int j=0; j<n; j+=1) do
3: O+=$(g_j-\Sigma_d a_d P_{dj})^2 \omega_j$
4: end for
5: if O>ε then
6: GOTO(1)
7: end if In various embodiments, the above AIS process is used to pre-compute a map between parameters $\beta_\rho$ and those of the mixture distribution $a_d$ and $b_d$, d=1; . . . ; D. The map can be stored in a lookup table for each ρ, and may be referenced during render time for every ray sampled. There is one row in the table for each variable in $\beta_\rho$ that is pre-computed. These values are $\phi_r$, $\theta_D$, $\sigma_\rho$, and e which are taken from a suitably fine grid. In certain embodiments, angles in 2 degree increments and eccentricity in 0.5 increments are used with suitable results. A lookup tables for TRT and GLINT combined may take up around 20 MB of disk space.

In various aspects, a row of the lookup table can be selected by a function of ($\phi_r$, $\theta_D$, $\sigma_\rho$, e). The function may first find an ideal row and then return the closest row in the table. Other parameters in $\beta_\rho$ can be defined by the user and evaluated at runtime.

FIGS. 7A, 7B, 7C, and 7D shows a comparison of four models for sampling hair, from top left to bottom right— ground truth path tracer, [Ou et al. 2012], [dEon et al. 2013], and the model of the present disclosure.

VI. HARDWARE DEVICE

Figure 8:
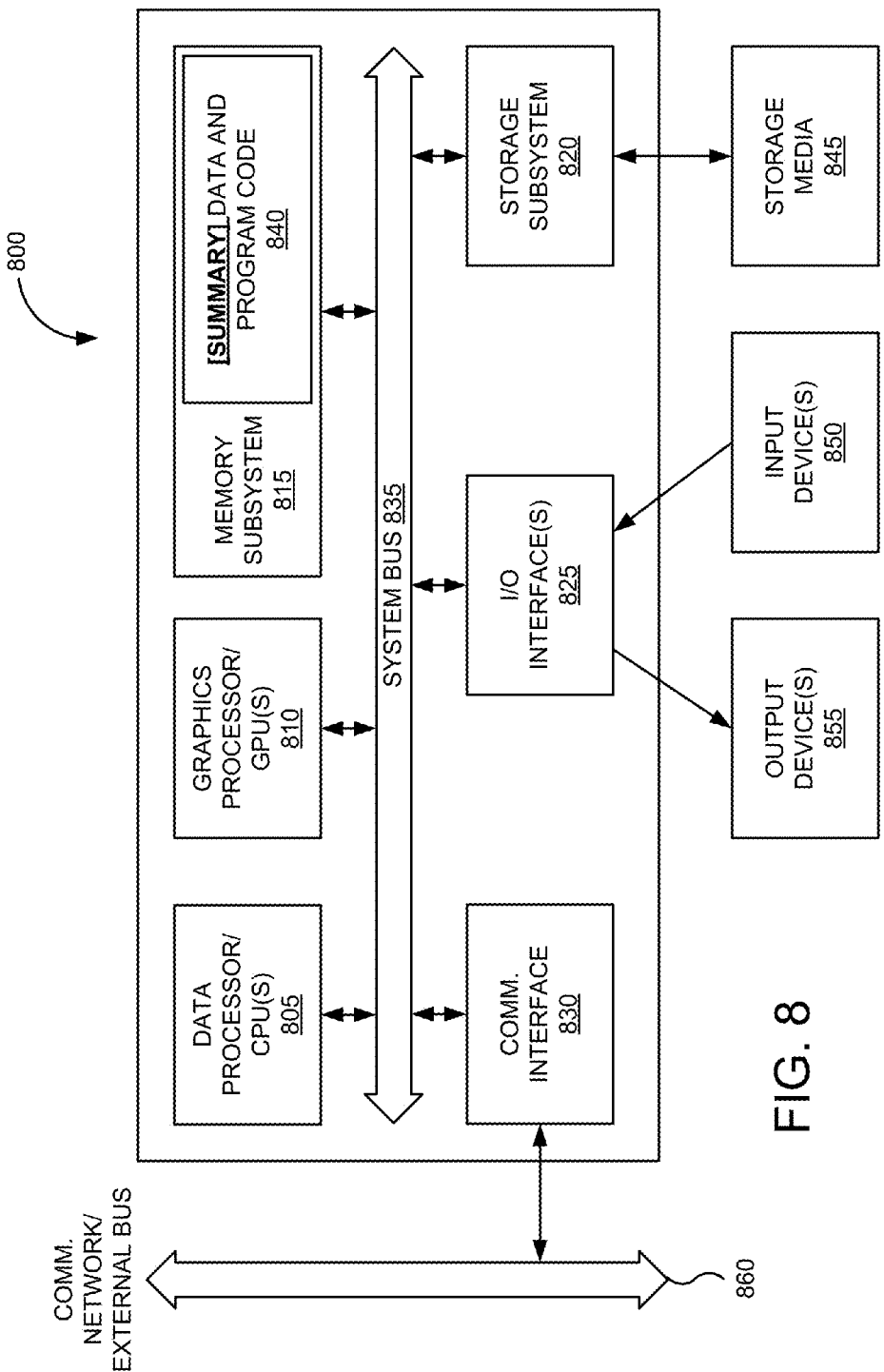
FIG. 8 is a block diagram of a computer system that may incorporate an embodiment, be incorporated into an embodiment, or be used to practice any of the innovations, embodiments, and/or examples found within this disclosure.

FIG. 8 is a block diagram of computer system 800 that may incorporate an embodiment, be incorporated into an embodiment, or be used to practice any of the innovations, embodiments, and/or examples found within this disclosure. FIG. 8 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 800 can include hardware and/or software elements configured for performing logic operations and calculations, input/output operations, machine communications, or the like. Computer system 800 may include familiar computer components, such as one or more one or more data processors or central processing units (CPUs) 805, one or more graphics processors or graphical processing units (GPUs) 810, memory subsystem 815, storage subsystem 820, one or more input/output (I/O) interfaces 825, communications interface 830, or the like. Computer system 800 can include system bus 835 interconnecting the above components and providing functionality, such as connectivity and inter-device communication. Computer system 800 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 805 can include hardware and/or software elements configured for executing logic or program code or for providing application-specific functionality. Some examples of CPU(s) 805 can include one or more microprocessors (e.g., single core and multi-core) or micro-controllers. CPUs 805 may include 4-bit, 8-bit, 12-bit, 16-bit, 32-bit, 64-bit, or the like architectures with similar or divergent internal and external instruction and data designs. CPUs 805 may further include a single core or multiple cores. Commercially available processors may include those provided by Intel of Santa Clara, Calif. (e.g., ×86, ×86_64, PENTIUM, CELERON, CORE, CORE 2, CORE ix, ITANIUM, XEON, etc.), by Advanced Micro Devices of Sunnyvale, Calif. (e.g., ×86, AMD_64, ATHLON, DURON, TURION, ATHLON XP/64, OPTERON, PHENOM, etc.). Commercially available processors may further include those conforming to the Advanced RISC Machine (ARM) architecture (e.g., ARMv7-9), POWER and POWERPC architecture, CELL architecture, and or the like. CPU(s) 805 may also include one or more field-gate programmable arrays (FPGAs), application-specific integrated circuits (ASICs), or other microcontrollers. The one or more data processors or central processing units (CPUs) 805 may include any number of registers, logic units, arithmetic units, caches, memory interfaces, or the like. The one or more data processors or central processing units (CPUs) 805 may further be integrated, irremovably or moveably, into one or more motherboards or daughter boards.

The one or more graphics processor or graphical processing units (GPUs) 810 can include hardware and/or software elements configured for executing logic or program code associated with graphics or for providing graphics-specific functionality. GPUs 810 may include any conventional graphics processing unit, such as those provided by conventional video cards. Some examples of GPUs are commercially available from NVIDIA, ATI, and other vendors. In various embodiments, GPUs 810 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 810 may include any number of registers, logic units, arithmetic units, caches, memory interfaces, or the like. The one or more data processors or central processing units (CPUs) 805 may further be integrated, irremovably or moveably, into one or more motherboards or daughter boards that include dedicated video memories, frame buffers, or the like.

Memory subsystem 815 can include hardware and/or software elements configured for storing information. Memory subsystem 815 may store information using machine-readable articles, information storage devices, or computer-readable storage media. Some examples of these articles used by memory subsystem 870 can include random access memories (RAM), read-only-memories (ROMS), volatile memories, non-volatile memories, and other semiconductor memories. In various embodiments, memory subsystem 815 can include data-driven light scattering data and program code 840.

Storage subsystem 820 can include hardware and/or software elements configured for storing information. Storage subsystem 820 may store information using machine-readable articles, information storage devices, or computer-readable storage media. Storage subsystem 820 may store information using storage media 845. Some examples of storage media 845 used by storage subsystem 820 can include floppy disks, hard disks, optical storage media such as CD-ROMS, DVDs and bar codes, removable storage devices, networked storage devices, or the like. In some embodiments, all or part of data-driven light scattering data and program code 840 may be stored using storage subsystem 820.

In various embodiments, computer system 800 may include one or more hypervisors or operating systems, such as WINDOWS, WINDOWS NT, WINDOWS XP, VISTA, WINDOWS 7 or the like from Microsoft of Redmond, Wash., Mac OS or Mac OS X from Apple Inc. of Cupertino, Calif., SOLARIS from Sun Microsystems, LINUX, UNIX, and other UNIX-based or UNIX-like operating systems. Computer system 800 may also include one or more applications configured to execute, perform, or otherwise implement techniques disclosed herein. These applications may be embodied as data-driven light scattering data and program code 840. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 815 and/or storage subsystem 820.

The one or more input/output (I/O) interfaces 825 can include hardware and/or software elements configured for performing I/O operations. One or more input devices 850 and/or one or more output devices 855 may be communicatively coupled to the one or more I/O interfaces 825.

The one or more input devices 850 can include hardware and/or software elements configured for receiving information from one or more sources for computer system 800. Some examples of the one or more input devices 850 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 850 may allow a user of computer system 800 to interact with one or more non-graphical or graphical user interfaces to enter a comment, select objects, icons, text, user interface widgets, or other user interface elements that appear on a monitor/display device via a command, a click of a button, or the like.

The one or more output devices 855 can include hardware and/or software elements configured for outputting information to one or more destinations for computer system 800. Some examples of the one or more output devices 855 can include a printer, a fax, a feedback device for a mouse or joystick, external storage systems, a monitor or other display device, a communications interface appropriately configured as a transceiver, or the like. The one or more output devices 855 may allow a user of computer system 800 to view objects, icons, text, user interface widgets, or other user interface elements.

A display device or monitor may be used with computer system 800 and can include hardware and/or software elements configured for displaying information. Some examples include familiar display devices, such as a television monitor, a cathode ray tube (CRT), a liquid crystal display (LCD), or the like.

Communications interface 830 can include hardware and/or software elements configured for performing communications operations, including sending and receiving data. Some examples of communications interface 830 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 830 may be coupled to communications network/external bus 880, such as a computer network, to a FireWire bus, a USB hub, or the like. In other embodiments, communications interface 830 may be physically integrated as hardware on a motherboard or daughter board of computer system 800, may be implemented as a software program, or the like, or may be implemented as a combination thereof.

In various embodiments, computer system 800 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 800.

As suggested, FIG. 8 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

VII. REFERENCES

CAPP'E, O., DOUC, R., GUILLIN, A., MARIN, J.-M., AND ROBERT, C. P. 2008. Adaptive importance sampling in general mixture classes. Statistics and Computing 18, 4, 447-459.

DE LA METTRIE, R., SAINT-L'EGER, D., LOUSSOUARN, G., GARCEL, A.-L., PORTER, C., AND LANGANEY, A. 2007. Shape variability and classification of human hair: a worldwide approach. Human biology 79, 3.

D'EON, E., FRANCOIS, G., HILL, M., LETTERI, J., AND AUBRY, J.-M. 2011. An energy-conserving hair reflectance model. In Computer Graphics Forum, vol. 30, Wiley Online Library, 1181-1187.

D'EON, E., MARSCHNER, S., AND HANIKA, J. 2013. Importance sampling for physically-based hair fiber models. In SIGGRAPH Asia 2013 Technical Briefs, ACM, 25.

GOLDMAN, D. B. 1997. Fake fur rendering. In Proceedings of the 24th annual conference on Computer graphics and interactive techniques, ACM Press/Addison-Wesley Publishing Co., 127-134.

HEITZ, E. 2014. Understanding the masking-shadowing function in microfacet-based brdfs.

HERY, C., AND RAMAMOORTHI, R. 2012. Importance sampling of reflection from hair fibers. Journal of Computer Graphics Techniques (JCGT) 1, 1, 1-17.

KAJIYA, J. T., AND KAY, T. L. 1989. Rendering fur with three dimensional textures. In ACM Siggraph Computer Graphics, vol. 23, ACM, 271-280.

MARSCHNER, S. R., JENSEN, H. W., CAMMARANO, M., WORLEY, S., AND HANRAHAN, P. 2003. Light scattering from human hair fibers. In ACM Transactions on Graphics (TOG), vol. 22, ACM, 780-791.

OH, M.-S., AND BERGER, J. O. 1992. Adaptive importance sampling in monte carlo integration. Journal of Statistical Computation and Simulation 41, 3-4, 143-168.

OU, J., XIE, F., KRISHNAMACHARI, P., AND PELLACINI, F. 2012. Ishair: importance sampling for hair scattering. In Computer Graphics Forum, vol. 31, Wiley Online Library, 1537-1545.

ROBBINS, C. R. 2012. Chemical and physical behavior of human hair.

SADEGHI, I., PRITCHETT, H., JENSEN, H. W., AND TAMSTORF, R. 2010. An artist friendly hair shading system. ACM Transactions on Graphics (TOG) 29, 4, 56.

WARD, K., BERTAILS, F., KIM, T.-Y., MARSCHNER, S. R., CANI, M.-P., AND LIN, M. C. 2007. A survey on hair modeling: Styling, simulation, and rendering. Visualization and Computer Graphics, IEEE Transactions on 13, 2, 213-234.

ZINKE, A., YUKSEL, C., WEBER, A., AND KEYSER, J. 2008. Dual scattering approximation for fast multiple scattering in hair. In ACM Transactions on Graphics (TOG), vol. 27, ACM, 32.

What is claimed is:

1. A method for modeling light interactions of hair fibers, the method comprising:
 receiving, at the computer, a model describing one or more subcomponents of light scattering by a hair fiber, at least one subcomponent of light scattering described by the model being generated by fitting a set of basis distributions to a scattering function, wherein the set of basis distributions includes multiple types of basis distributions, and wherein each basis distribution indicates a distribution of angles of light exiting the hair fiber when illuminated from an incoming direction;
 determining, by the computer, a set of light rays directed toward the hair fiber that correspond to a light ray directed away from the hair fiber toward a view associated with an image of the hair fiber, wherein angles of the set of light rays are determined using importance sampling determined from closed-form solutions of the set of basis distributions; and
 generating, by the computer, information indicative of a radiance for the light ray directed away from the hair fiber toward the view based on the model as applied to one or more of the set of light rays directed toward the hair fiber.

2. The method of claim 1 wherein the set of basis distributions provide an approximation to transmission-reflection-transmission light refraction through the hair fiber.

3. The method of claim 1 wherein the set of basis distributions provide an approximation to glint light refraction through the hair fiber.

4. The method of claim 1 further comprising receiving, at the computer, information describing properties of the hair fiber as a parameter set specifying a desired color parameter, eccentricity parameter, scale parameter, curl parameter, or Fresnel parameter that are used for determining the scattering function.

5. The method of claim 1 further comprising:
rendering, by the computer, the image of the hair fiber using the information indicative of the radiance for the light ray directed away from the hair fiber.

6. The method of claim 1 wherein generating, by the computer, the information indicative of the radiance for the light ray directed away from the hair fiber comprises determining an average of radiances indicated by the determined set of light rays.

7. The method of claim 1, wherein the multiple types of basis distributions comprise at least two types selected from a group consisting of: a logistic distribution, a skew logistic distribution, a monomial distribution, and a Cauchy distribution.

8. The method of claim 1, wherein the importance sampling uses a cumulative density function (CDF) determined by inverting the closed-form integral of the set of basis distributions.

9. The method of claim 1, wherein the hair fiber is elliptical.

10. The method of claim 1, wherein the at least one subcomponent comprise a subcomponent for each of reflection, transmission-transmission light refraction, transmission-reflection-transmission light refraction, and glint light refraction, each of which is determined using a different fitting of basis distributions.

11. A non-transitory computer-readable medium storing a computer program product executable by one or more processors associated with one or more computer systems for modeling light interactions of hair fibers, the non-transitory computer-readable medium comprising:
code that causes the one or more processors to receive a model describing one or more subcomponents of light scattering by a hair fiber, at least one subcomponent of light scattering described by the model generated by fitting a set of basis distributions to a scattering function, wherein the set of basis distributions includes multiple types of basis distributions, and wherein each basis distribution indicates a distribution of angles of light exiting the hair fiber when illuminated from an incoming direction;
code that causes the one or more processors to determine a set of light rays directed toward the hair fiber that correspond to a light ray directed away from the hair fiber toward a view associated with an image of the hair fiber, wherein angles of the set of light rays are determined using importance sampling determined from closed-form solutions of the set of basis distributions; and
code that causes the one or more processors to generate information indicative of a radiance for the light ray directed away from the hair fiber toward the view based on the model as applied to one or more of the set of light rays directed toward the hair fiber.

12. The non-transitory computer-readable medium of claim 11 wherein the set of basis distributions provide an approximation to transmission-reflection-transmission light refraction through the hair fiber.

13. The non-transitory computer-readable medium of claim 11 wherein the set of basis distributions provide an approximation to glint light refraction through the hair fiber.

14. The non-transitory computer-readable medium of claim 11 further comprising code that causes the one or more processors to receive information describing properties of the hair fiber as a parameter set specifying a desired color parameter, eccentricity parameter, scale parameter, curl parameter, or fresnel parameter.

15. The non-transitory computer-readable medium of claim 11 further comprising:
code that causes the one or more processors to render the image of the hair fiber using the information indicative of the radiance for the light ray directed away from the hair fiber.

16. The non-transitory computer-readable medium of claim 11 wherein the code that causes the one or more processors to generate the information indicative of the radiance for the light ray directed away from the hair fiber includes code that causes the one or more processors to determine an average of radiances indicated by the determined set of light rays.

17. The non-transitory computer-readable medium of claim 11, wherein the multiple types of basis distributions comprise at least two types selected from a group consisting of: a logistic distribution, a skew logistic distribution, a monomial distribution, and a Cauchy distribution.

* * * * *